United States Patent
Chang et al.

(10) Patent No.: US 6,864,901 B2
(45) Date of Patent: Mar. 8, 2005

(54) REAL-TIME SCREEN RECORDING SYSTEM

(75) Inventors: Shin-Hung Chang, Taipei (TW);
Shao-Ting Lee, Taipei (TW);
Jan-Ming Ho, Taipei (TW)

(73) Assignee: Academia Sinica, Taipei (TW)

( * ) Notice: Subject to any disclaimer, the term of this patent is extended or adjusted under 35 U.S.C. 154(b) by 221 days.

(21) Appl. No.: 10/361,500

(22) Filed: Feb. 11, 2003

(65) Prior Publication Data

US 2004/0155910 A1 Aug. 12, 2004

(51) Int. Cl.$^7$ .............................. G09G 5/00; H04N 7/14; H04N 5/228; G06K 9/62
(52) U.S. Cl. .................. 345/704; 345/716; 345/748; 382/155; 382/157; 348/14.01; 348/208.16
(58) Field of Search ................................. 345/704, 716, 345/719, 748; 382/155, 157; 348/14.01, 14.02, 14.03, 208.16

(56) References Cited

U.S. PATENT DOCUMENTS

| | | | | |
|---|---|---|---|---|
| 5,790,114 A | * | 8/1998 | Geaghan et al. ............. 715/763 |
| 5,859,979 A | * | 1/1999 | Tung et al. .................. 109/228 |
| 6,343,313 B1 | * | 1/2002 | Salesky et al. .............. 709/204 |
| 6,595,781 B2 | * | 7/2003 | Sutton ........................ 434/276 |
| 6,665,004 B1 | * | 12/2003 | Paff ............................ 348/156 |

* cited by examiner

Primary Examiner—Regina Liang
Assistant Examiner—Duc Q Dinh
(74) Attorney, Agent, or Firm—Bacon & Thomas PLLC

(57) ABSTRACT

A real-time screen recording system is disclosed. Under the design of the real-time screen recording system of this invention, the Event Inspector records updated regions of the screen when a windows update event is generated, the Periodical Extractor records the screen updates periodically. This mechanism ensures that all updates will be recorded. The Event Filter inspects the update events to identify events relating to updates of screen to ensure correct recording of the updated regions. The Sporadic Controller adjusts the working frequency of the Periodical Extractor, so that the Periodical Extractor operates in an efficient manner. The Update Region Filter filters out unnecessary updated regions to avoid heavy workload of the computer system. As a result, an efficient and correct screen recording system may be achieved.

8 Claims, 4 Drawing Sheets

REAL-TIME SCREEN RECORDING SYSTEM

FIELD OF INVENTION

This invention relates to a real-time screen recording system, especially to a screen recording system using a sporadic control mechanism.

BACKGROUND OF INVENTION

Distance learning service has become a more and more popular way for the public to acquire knowledge. With the developments in the broadband networking system and the video data compression technologies, computer systems used in distanced learning are able to provide stream broadcasting of live content or on-demand video streams of archive contents.

In the conventional distance learning system, videos of screen displayed in the instructor's computer are taken by a video camera and are processed and broadcasted to audiences. However, due to the low resolution of the video camera, images of screen displayed in the video are usually blurred, when this video content is displayed in the audience site. This makes it difficult for the distanced audiences to recognize the images that are displayed in the computer screen of the instructor. Therefore, real-time screen recording of the computer screen at the instructor site, so to broadcast the recorded images to the distanced audience, has become necessary in the distanced learning system.

In the conventional art, two approaches to provide real-time recording of the screen display of the instructor are proposed.

The first approach is implemented at the application layer of the distance learning system. The screen recorder captures the bit-maps of a series of images that are displayed on the computer screen and organizes them into a sequence of images to be broadcasted to the audience, such that real-time displaying of the computer screen at the instructor site is achieved. Commercially available products using this design include: WinStructor (Trademark of FlickFree Multimedia Products ApS), HyperCam (Trademark of Hyperionics Technology, LLC) and Microsoft Media Encoder (Trademark of Microsoft Corporation). A screen recording system adopting this technology functions independently from the hardware and the software configuration (such as display driver, display chipset, color mode and display resolution) of the computer system at the instructor site. However, due to the limited bandwidth of the devices (such as backplane buses and display chipsets) used to transmit the recorded images, the frame rate of contents recorded by theses products is usually low. The low frame rate will results in jittery presentation in the screen displays of the distanced audience.

The second approach is implemented in the driver layer. Under such a design, the screen recorder captures the data sent to the display driver and saves it into a proprietary streaming and archive format. A typical commercially available product using this design is ScreenWatch (Trademark of OPTX International). Under this approach, an additional recording driver will be needed to embed into the operating system. This gives it a restriction to the configurations and specifications of hardware (such as device drivers and display cards) and software (such as display resolution or color mode) applicable in the distance learning system. Additionally, if display data sent to the display driver is in a large quantity (playback a video or demonstrate an animation), the display driver might not be able to capture all the data to be displayed. As a result, the whole screen recording system would stop to operate.

In order to avoid the incompatibility of system configurations and the malfunction of the screen system (drawbacks of adapting the second approach), most screen recording systems are implemented at the application layer (adapting the first approach). However, when the screen recording system is implemented in the application layer, the frequency in capturing the full screen would be relatively low, due to the limited bandwidth of the backplan bus. This makes it impossible to record the full motions of a computer screen at the application layer, unless a good mechanism is provided to improve the frame rate in the recording operation.

It is thus necessary to provide a novel real-time screen recording system to increase the recording frame rate of the system.

It is also necessary to provide a screen recoding system to reduce the CPU utilization of the computer using the screen recording system.

It is also necessary to provide an application layered, real-time screen recording system to enable the real-time recording of the screen display of a computer system.

OBJECTIVES OF INVENTION

The objective of this invention is to provide a novel real-time screen recording system to increase the recording frame rate of the system.

Another objective of this invention is to provide a screen recording system to reduce CPU utilization of the computer using the screen recording system.

Another objective of this invention is to provide an application layered, real-time screen recording system to enable the real-time recording of the screen display of a computer system.

SUMMARY OF INVENTION

A real-time screen recording system is disclosed. Under the design of the real-time screen recording system of this invention, the Event Inspector records updated regions of the screen when a windows update event is generated, the Periodical Extractor records the screen updates periodically. This mechanism ensures that all updates will be recorded. The Event Filter inspects the update events to identify events relating to updates of screen to ensure correct recording of the updated regions. The Sporadic Controller adjusts the working frequency of the Periodical Extractor, so that the Periodical Extractor operates in an efficient manner. The Update Region Filter filters out unnecessary updated regions to avoid heavy workload of the computer system. As a result, an efficient and correct screen recording system may be achieved.

The above and other objectives and advantages of this invention may be clearly understood from the detailed description by referring to the following drawings.

Figure 1:
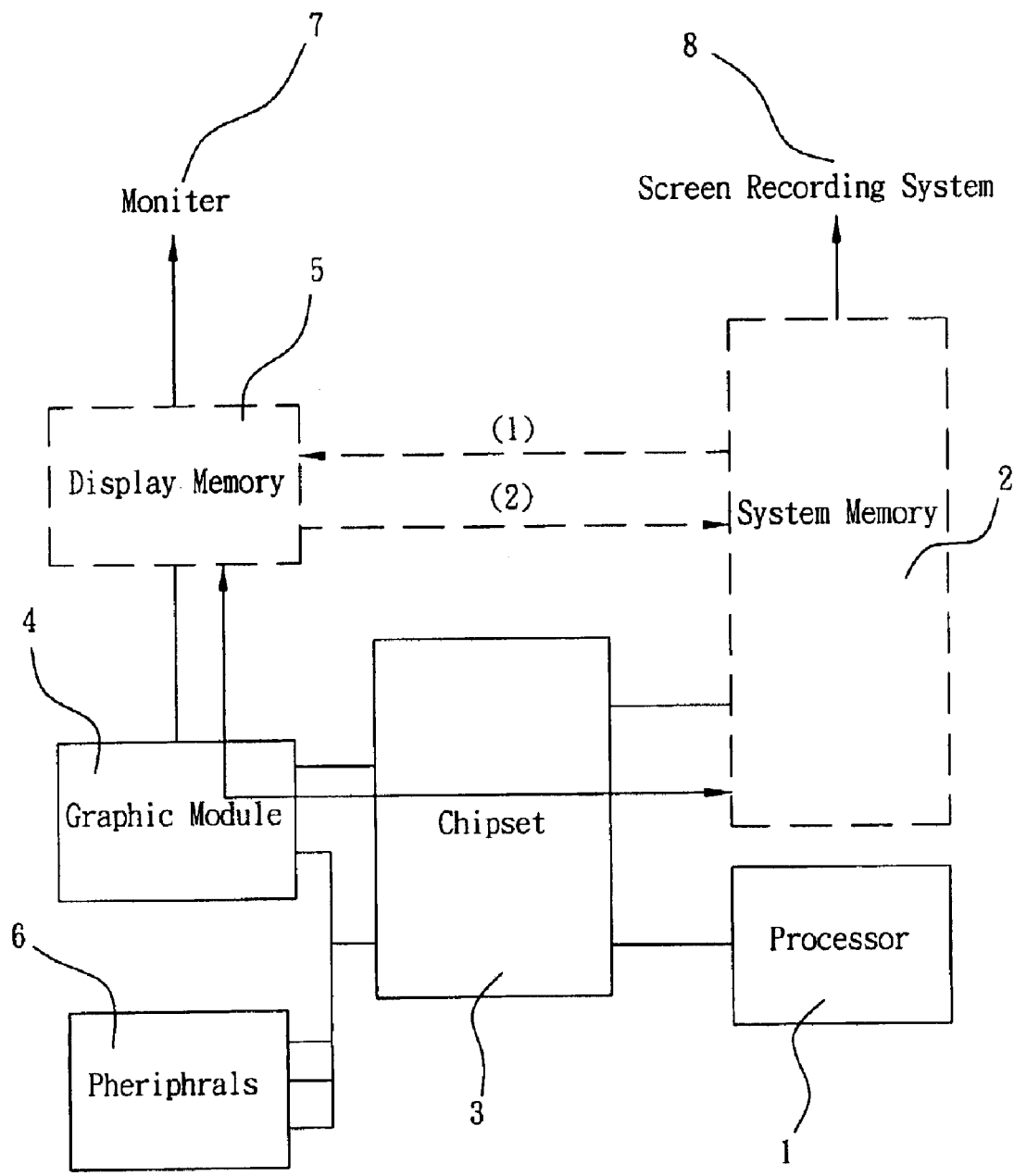
FIG. 1 illustrates a system diagram of a conventional computer system.

Table 1 shows hardware and software configurations of a computer system using screen recorders.

DETAILED DESCRIPTION OF INVENTION

Although it is not intended to limit the scope of this invention, it has been found that, when a computer program is running in a computer, contents as displayed on the screen is changing in response to the operation of the program. However, although the displayed image changes, not all regions of the displayed image change from time to time; some regions remain unchanged, while others change. For example, when several windows are opened in a screen during a lecture, most windows don't change in their contents frequently but the windows displaying video playbacks, dynamic web pages and the clock timer change their contents from time to time. If the regions in which displayed contents change or are updated can be identified and recorded upon their change or update, it is possible to smoothly replicate the screen display in the screen of another computer by supplying to the other computer only the data of the changed or updated regions, such that quantity of data to be recorded and transmitted may be significantly reduced and the frame rate during the transmission can be dramatically increased.

Most computer window systems, including Macintosh, MS-Windows and X-Windows are event- or message-driven. Under such systems, a part of events or messages generated during the operation of a computer program correlate with screen updates. Based on the parameters associated with these update driving events or messages, it is possible to identify the updated regions on the screen display of the computer. On the other hand, not all screen updates trigger system events or messages. If only the update driving events or messages are used to update the screen display of the audience computers, some updates will thus be omitted, without being recorded. It is thus necessary to capture the whole screen of the instructor computer from time to time, so that the screen display of the audience computers may be updated correctly.

As a result, it is desirable to have a screen recording system which is able to operate basically by: (1) intercepting system messages to identify variations in the screen display, so to record the variations upon such events (the "event inspector (EI)") and (2) capturing the whole screen display and comparing which with the previous captured one to extract the modified regions from time to time (the "periodic extractor (PE)"). Continuous executions of the above two operations by the screen recording system would be sufficient to record the screen display in less time-critical applications. However, if such policy is applied in a distance learning application, instructors may find it difficult to operate the application software at the instructor site. This is due to the fact that most capacity of the CPU (central processing unite) of the instructor's computer is occupied by the operations of the screen recording operations. In addition, when the application software generates a large number of variations in the screen display, a quantity of event messages will thus need to be processed. The instantaneous heavy workload of such operations would usually slow down the computer system and the network system and, thus, degrades the quality of distance learning services.

Although it is not intended to limit the scope of this invention, in order to avoid the instantaneous heavy workloads and to guarantee the service quality of the screen recording system at the same time, in the present invention a novel application-layered control mechanism, the "sporadic control (SC)" mechanism is provided. The sporadic control (SC) mechanism regulates the operational frequency of the periodic extractor (PE) to release the computer system and the network system from instantaneous heavy workload. Under the mechanism of the screen recording system of this invention, the workload of the CPU may be reduced by more than 15%.

A detailed description to the screen recording system of this invention will be given below.

FIG. 1 illustrates a system diagram of a conventional computer system. As shown in this figure, a computer system has a processor (such as a CPU) 1, a chipset (such as a north-bridge chipset) 2, a system memory (such as a dynamic random access memory—DRAM) 3, a graphic module 4, a display memory 5 and other peripherals 6. Such a computer system enables itself to display graphic images on the screen 7 of the computer. Among these modules, a plurality of data buses are provided to connect the modules and to function as data transmission media, allowing information and signals to travel between or among modules.

Also as shown in this figure, the system bus connects the chipset 3 and the processor 1, and the chipset 3 and the system memory 2. The backplane bus, on the other hand, connects the chipset 3 and the graphic module 4 and other peripherals 6. In order to display graphic images on the screen 7, the chipset 3 needs to transmit data flowing from the system memory 2 to the display memory 5 and from the display memory 5 to the system memory 2. As there are many commercially available products that optimize the processing of data flowing from the system memory 2 to the display memory 5, the efficiency of data transmission in this direction is higher than that of the reverse direction.

The architecture and operation of the computer system as shown in FIG. 1 is well known to those skilled in the art. Detailed description thereof is thus omitted.

In this figure, a screen recording system 8 is provided to record the screen display of the display 7 and is connected to the system memory 2 of the computer system. The information as recorded by the screen recording system 8 is processed and broadcast to the computer systems of the audience at a distance.

Figure 2:
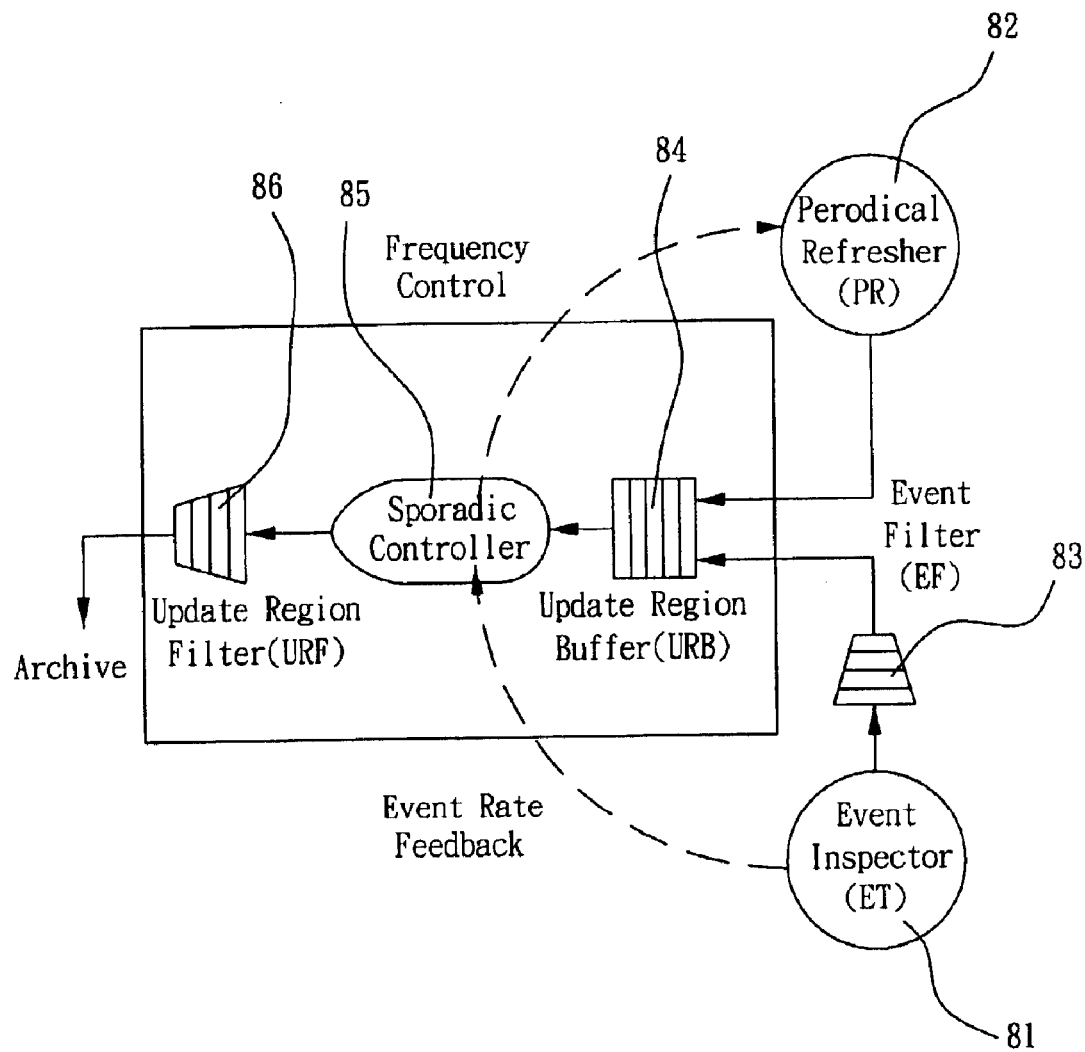
FIG. 2 illustrates the system diagram of the screen recording system 8 of this invention.

FIG. 2 illustrates the system diagram of the screen recording system 8 of this invention. As shown in this figure, the screen recording system 8 of this invention comprises: an event inspector (EI) 81 to inspect the variations of the graphic page to be displayed in the display 7 and to record such variations upon any of such event, a periodic extractor (PE) 82 to periodically record parts of or the whole graphic page to be displayed in the display 7, an event filter (EF) 83 to filter out unnecessary screen recording trigger events, an update region buffer (URB) 84 to store screen recording data to be broadcast to the audience, a sporadic controller (SC) 85 to control the frequency of the operation of the periodic extractor 82 according to event rate information of the EI 81, and an update region filter (URF) 86 to filter out unnecessary update region information.

Event Inspector (EI) 81: The EI 81 inspects all the "events" generated by the kernel of the operation system (such as an windows system) of the computer system. As described above, nowadays, windows systems are executed through a message- or event-driven approach. When a windows system begins to operate, the kernel of the system creates a global "message (or event) queue" to handle the operation of the program. This queue file stores messages (from such as keyboard, mouse, etc. and other updates to the displaying page) that relate to the various windows as created by the programs being executed. The EI 81 intercepts the messages in this message queue and collects all these events and sends the information to the event filter 83.

Event Filter (EF) 83: The EF 83 receives all the events as identified by the EI 81 and identifies those correlated to updates of the screen display. From the information contained in the screen update events, it is possible to pick up data of the changed regions on the screen. The EF 83 then sends the changed region related information data to the update region buffer 84 to be archived. The technology to identify the screen update related messages is well known to those skilled in the art. Detailed description thereof is thus omitted.

Update Region Buffer (URB) 84: The URB 84 collects and stores data of the updated regions for archiving these data in a proprietary format.

Periodical Extractor (PE) 82: The PE 82 periodically captures the current screen display and compares it with the previously captured one. By computing the modified parts (differences between screen displays), the PE 82 captures the updated regions data and sends them to the URB 84 for archiving. In one embodiment of this invention, the PE 82 captures data of the whole screen and compares the data with data of the previously captured screen to find the updated regions. In other embodiments only a part of the screen display is captured to find the updated regions.

Sporadic Controller (SC) 85: The SC 85 is designed to make high-leveled decisions, including when to archive data of updated regions, when to combine updated regions, when to compare frames and when to produce intra frames. From the basis of event rate feedback information generated by the EI 81 and the rate of updated regions extracted by the PE 82, the SC 85 is able to adjust the frequency of the updated region capturing processing of the PE 82.

By coordinating these modules, the processing rate of the screen recording operation may be regulated under a stable state. In one embodiment of this invention, the SC 85 is installed in the computer for which the screen is to be recorded, whereby the SC 85 starts to operate when the screen recording process starts to operating, this mechanism is working.

The SC 85 decides the frequency of triggering the PE 82 (noted by f(PE) in the following) according to rate of windows update events as recorded by the EI 81 (noted by r(EI) in the following) and rate of updated regions extracted by the PE 82 (noted by r(PE) in the following). Let ↑(.) represent increase, ↓(.) represent decrease and =(.) represent maintaining of frequency. There are four situations to be stated as follows.

(1) If ↑(r(EI)) and ↑(r(PE)), then ↓(f(PE)) or =(f(PE)).
(2) If ↑(r(EI)) and ↓(r(PE)), then ↓(f(PE)) or =(f(PE)).
(3) If ↓(r(EI)) and ↑(r(PE)), then ↑(f(PE)).
(4) If ↓(r(EI)) and ↓(r(PE)), then ↓(f(PE)) or=(f(PE)).

Only in situation (3) does the SC 85 increase the recording frequency of the PE 82. In one embodiment of this invention, the working frequency of PE 82 is set to five levels. The levels may be 0.1 times/sec., 0.25 time/sec., 0.5 times/sec., 1 times/sec. and 2 times/sec. As in an initial stage, the working frequency of PE 82 is set to be 0.5 time/sec.

Update Region Filter (URF) 86: The URF 86 receives data representing all the updated regions as recorded by the EI 81 and the PE 82. Due to the fact that the occurrence of updated regions is unpredictable, intensive or crowded updates of the screen display will occur sometimes. In order not to influence the quality of the display, when two or more updates occur within a short time, one or more updates need to be discard. The URF 86 filters the incoming data representing the updated regions so as to avoid the instantaneous heavy workload, while the display of the updated regions is maintained in a stable situation. In one embodiment of this invention, for example, when four consequent updates are received by the UFR 86, the second and the fourth updates will be discard.

Under the design of the real-time screen recording system of this invention, the EI 81 records updated regions of the screen when a windows update event is generated, the PE 82 records the updates periodically. This mechanism ensures that almost all updates will be recorded. The EF 83 inspects the update events to identify events relating to updates of screen to ensure correct recording of the updated regions. The SC 85 adjusts the working frequency of the PE 82, so that the PE 82 operates in an efficient manner. The URF 86 filters out unnecessary updated regions to avoid heavy workload of the computer system. As a result, an efficient and correct screen recording system may be achieved.

In the embodiment of this invention, an integrator (not shown) may be provided. It is found that some update regions, as recorded by the EI 81 and PE 82, may contain overlapped portions in them. The integrator is used to match the overlapped regions, so that unnecessary recording of updated regions may be reduced. In an embodiment of this invention, when updated regions recorded in a predetermined period of time have one or more overlapped portions and the area of overlapped area is larger than that of their joined areas resulted from combination, these updated regions are combined into a new updated region. Of course, other approaches to reduce unnecessary recording of updated regions are also applicable in this invention.

EMBODIMENT

Figure 3:
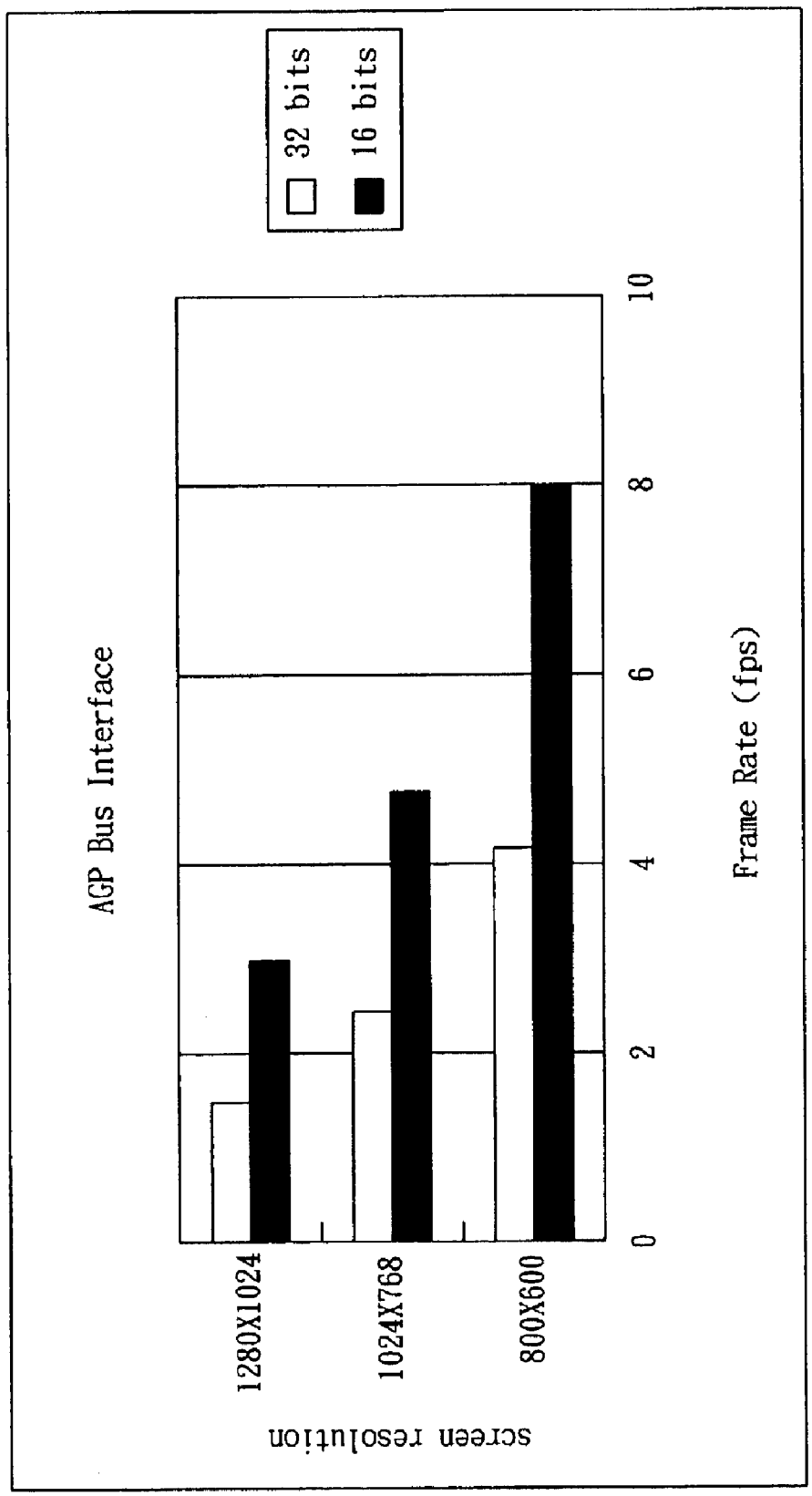
FIG. 3 shows the experimental results of a full screen recorder in its frame rate.
Figure 4A:
FIGS. 4(*a*)–4(*d*) show experimental results of computer systems with screen recorders of the conventional art and the present invention in their CPU utilization.
Figure 4B:
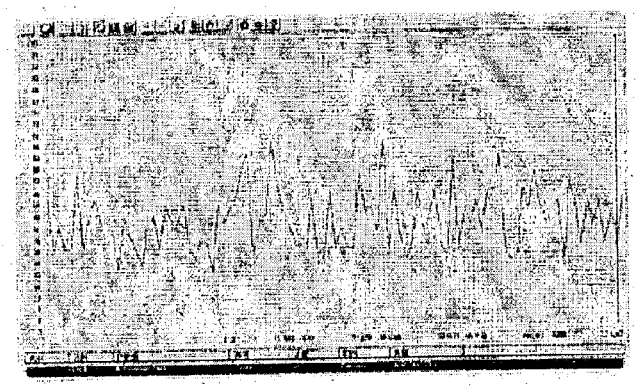
Figure 4C:
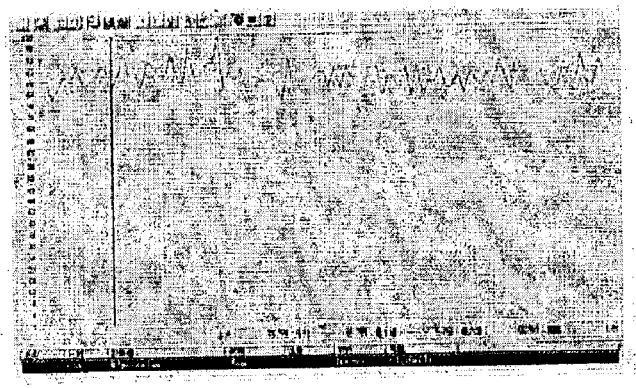
Figure 4D:
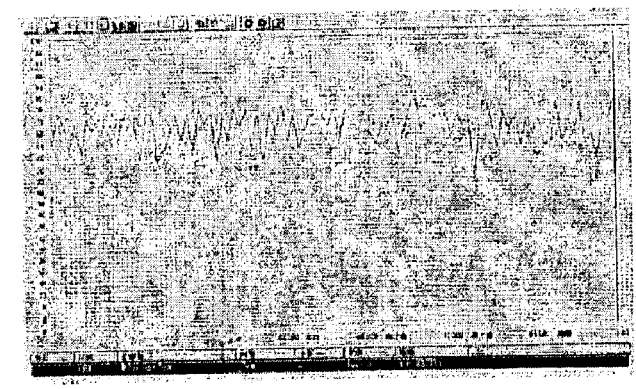

The efficiency of capturing the full screen of a computer under Windows XP is tested. The hardware and software configurations of this embodiment of the screen recording system include: CPU: Pentium III 700, chipset: Intel 8244BX, OS: Windows XP. Experimental results are presented in FIG. 3.

In this experiment, the process of capturing full screen runs in best effort. From the experimental results in FIG. 3, it is found that the frame rate of capturing full screens is usually low (10<frames per second). However, in a screen recording system, frames as captured usually need to be compressed for streaming and archiving. Therefore, the number of real-time captured frame may even less.

For comparison purposes, the CPU utilization rate when running the real-time screen recording system of this invention is tested. The screen recording system uses the "performance monitor" software in Microsoft Windows system. Experimental results are presented in FIG. 4. As shown in FIGS. 4(*a*) and 4(*b*), typical traces of CPU utilization when the screen recorder is running without and with the sporadic control mechanism are shown respectively. In FIGS. 4(*c*) and 4(*d*), the CPU utilization when the screen recorder is running while the lecturer is receiving a remote videostreaming program is shown. As shown in these figures, the average CPU utilization rates of these 4 scenarios are 76%, 37.6%, 85%, and 69.2%, respectively.

Compared with the screen recording system without the SC mechanism, the CPU utilization of this invention with the SC mechanism is reduced by more than 15%.

As the present invention has been shown and described with reference to preferred embodiments thereof, those skilled in the art will recognize that the above and other changes may be made therein without departing form the spirit and scope of the invention.

What is claimed is:

1. A real-time screen recording system to record the screen display data of a computer system, comprising:

an event inspector to inspect event messages generated by operation system of said computer system and to record event data represented by said message;

an event filter to receive said event data recorded by said event inspector, to filter out data irrelevant to changes or updates of screen display and to record data representing changed or updated regions of said screen display;

a periodical extractor to periodically obtain current screen display data of said computer system and compare said data with that of a previously obtained screen to record data of updated regions of said screen display;

a sporadic controller to adjust working frequency of said periodical extractor according to event generation rate of said event inspector and working frequency of said periodical extractor in recording updated region data of said screen display; and an updated region buffer to store data representing changed or updated regions of said screen display for further processing.

2. The real-time screen recording system according to claim 1, further comprising an updated region filter to discard updated regions when changes or updates of screen display occur for more then a predetermined number within a determined period of time.

3. The real-time screen recording system according to claim 1, further comprising an integrator to combine at least two changed or updated regions into an integrated updated region when two or more changed or updated regions contain overlapped regions.

4. The real-time screen recording system according to claim 1, 2 or 3, wherein said sporadic controller increases working frequency of said periodical extractor in recording updated regions of said screen display, when event generation rate of said event inspector decrees and working frequency of said sporadic controller increases.

5. A real-time screen recording method to record the screen display data of a computer system, comprising:

a step of inspecting event messages generated by operation system of said computer system and recording event data represented by said message;

a step of filtering out data irrelevant to changes or updates of screen display from event data recorded by said event inspector and recording data representing changed or updated regions of said screen display;

a step of periodically obtaining current screen display data of said computer system and comparing said data with that of a previously obtained screen to record data of updated regions of said screen display; and a step of adjusting working frequency of said current display data obtaining processing according to event generation rate of said event inspector and working frequency of said periodical extractor in recording updated region data of said screen display.

6. The real-time screen recording method according to claim 5, further comprising a step of discarding updated regions when changes or updates of screen display in said real-time screen recording system occur for more then a predetermined number within a determined period of time.

7. The real-time screen recording method according to claim 5, further comprising a step of combining at least two changed or updated regions into an integrated updated region when two or more changed or updated regions contain overlapped regions.

8. The real-time screen recording method according to claim 5, 6 or 7, wherein said working frequency of said current display data obtaining processing is made increased, when event rate generated from said event inspecting processing decrees and working frequency of said current display data obtaining processing increases.

* * * * *